(12) United States Patent
Oh

(10) Patent No.: US 11,828,411 B1
(45) Date of Patent: Nov. 28, 2023

(54) BRACKET DEVICE FOR INSTALLING EXPANSION TANK

(71) Applicant: KOFULSO CO., LTD., Incheon-si (KR)

(72) Inventor: Seung-il Oh, Seoul (KR)

(73) Assignee: KOFULSO CO., LTD, Seoul (KR)

(*) Notice: Subject to any disclaimer, the term of this patent is extended or adjusted under 35 U.S.C. 154(b) by 0 days.

(21) Appl. No.: 17/947,317

(22) Filed: Sep. 19, 2022

(30) Foreign Application Priority Data

Jul. 15, 2022 (KR) .................. 10-2022-0087326

(51) Int. Cl.
*F16B 2/08* (2006.01)
*F16M 13/02* (2006.01)

(52) U.S. Cl.
CPC .............. *F16M 13/02* (2013.01); *F16B 2/08* (2013.01)

(58) Field of Classification Search
CPC ........ A47G 23/02; B60N 3/105; B60N 3/106; B60N 3/108; F16B 2/08
USPC .......... 248/102, 103, 104, 230.8, 311.2, 312, 248/312.1, 318; 211/71.01, 74; 220/562, 220/564, 476, 477, 480, 481, 482
See application file for complete search history.

(56) References Cited

U.S. PATENT DOCUMENTS

| | | | | |
|---|---|---|---|---|
| 2,029,707 A | * | 2/1936 | Dodelin | A62C 13/78 248/313 |
| 2,835,954 A | * | 5/1958 | Dahl | F16L 33/04 24/279 |
| 3,336,643 A | * | 8/1967 | Robison | F41F 3/052 24/270 |
| 3,429,542 A | * | 2/1969 | Fagan | A62C 13/78 211/75 |
| 4,379,541 A | * | 4/1983 | Harkness | A47K 1/08 248/313 |
| 4,784,360 A | * | 11/1988 | Mok | B60N 3/101 248/311.2 |
| 4,848,714 A | | 7/1989 | Ziaylek, Jr. et al. | |
| 4,905,950 A | * | 3/1990 | Turner | A62C 13/78 248/229.1 |
| 5,071,100 A | | 12/1991 | Sweeny | |
| 5,190,260 A | | 3/1993 | Daubenspeck | |
| 5,362,022 A | | 11/1994 | McLoughlin et al. | |
| 5,487,518 A | | 1/1996 | McCraney et al. | |
| 5,897,086 A | | 4/1999 | Condon | |
| 6,095,472 A | | 8/2000 | Hubbard | |
| 6,220,557 B1 | | 4/2001 | Ziaylek et al. | |
| 6,926,242 B2 | | 8/2005 | Hall | |

(Continued)

*Primary Examiner* — Alfred J Wujciak
(74) *Attorney, Agent, or Firm* — Jacobson Holman PLLC

(57) ABSTRACT

The bracket device includes: a supporting member including a first supporting part having a groove into which a nipple of an expansion tank is inserted, a second supporting part bent perpendicularly to the first supporting part, sidewall parts formed on both sides of the second supporting part, and locking parts formed on the sidewall parts; a strip member, which includes first and second binding members having loop parts one each end so that the locking part is forcedly fit thereto, a tension spring connected to the other end of the first binding member and to one end of a third binding member, and a tightening member to which the other end of the third binding member is hinge-coupled and also is hinge-coupled to the other end of the second binding member.

5 Claims, 5 Drawing Sheets

(56) References Cited

U.S. PATENT DOCUMENTS

| | | | |
|---|---|---|---|
| 7,344,116 B2 * | 3/2008 | Ficarra | B63C 11/02 |
| | | | 215/388 |
| 7,503,535 B2 | 3/2009 | Ziaylek | |
| 7,650,948 B2 * | 1/2010 | Rousseau | A62C 13/76 |
| | | | 340/568.8 |
| 8,052,209 B2 | 11/2011 | Bostrom et al. | |
| 8,191,848 B2 | 6/2012 | McLoughlin et al. | |
| 8,220,764 B2 | 7/2012 | Ziaylek | |
| 8,668,178 B2 | 3/2014 | Ziaylek et al. | |
| 9,605,798 B2 * | 3/2017 | Brown | F24D 3/1016 |
| 10,203,065 B2 | 2/2019 | Brown et al. | |
| 10,429,097 B1 * | 10/2019 | Sexton | F24H 1/188 |
| 2005/0056744 A1 * | 3/2005 | Ware | G09F 15/0037 |
| | | | 248/230.8 |
| 2012/0286120 A1 * | 11/2012 | Ziaylek | F17C 13/084 |
| | | | 248/312 |
| 2013/0334269 A1 * | 12/2013 | Cardonna | B60R 7/08 |
| | | | 224/570 |
| 2017/0276405 A1 * | 9/2017 | Bober | F24H 9/06 |

\* cited by examiner

BRACKET DEVICE FOR INSTALLING EXPANSION TANK

BACKGROUND OF THE INVENTION

Field of the Invention

The present invention relates to a bracket device for installing an expansion tank, and more specifically, to a bracket device for installing an expansion tank of a hot water heating system of a new structure to conveniently install a cylindrical expansion tank.

Background Art

U.S. Pat. No. 10,203,065 discloses a bracket device for installing an expansion tank of a hot water heating system.

As illustrated in FIG. 1, an expansion tank 5 is closely attached to a support member 4 by a strip member 1 by using a screw 2 mounted at one side of the strip member 1 of a band shape and a plurality of grooves 3 formed in the other side of the strip member 1.

In U.S. Pat. No. 10,203,065, the bracket device for installing an expansion tank of the conventional hot water heating system includes: a strip member 1 having a band shape; and a binding means for fixing the expansion tank 5 to the support member 4 after rolling the strip member 1.

However, after the strip member 1 passes the support member 4 and the cylindrical portion of the expansion tank 5 is placed on the support member 4, a fastening means including the screw 2 is tightened by a tool such as a driver. So, the conventional bracket device for installing an expansion tank described in U.S. Pat. No. 10,203,065 has a problem in that installation work of the expansion tank is inefficient.

Therefore, the inventor of the present invention has invented a bracket device for installing an expansion tank according to the present invention after a lot of hard work in development of a bracket device capable of installing an expansion valve to a support member more conveniently.

SUMMARY OF THE INVENTION

Accordingly, the present invention has been made to solve the above-mentioned problems occurring in the prior art, and it is an object of the present invention to provide a bracket device for installing an expansion tank of a new structure, capable of firmly installing an expansion tank to a support member only by fastening a tightening member with a hand without preliminary work of passing a strip member through the support member.

To accomplish the above object, according to the present invention, there is provided a bracket device for installing an expansion tank including: a supporting member, which includes a first supporting part having a groove into which the nipple of the expansion tank is inserted, a second supporting part bent perpendicularly at one end of the first supporting part, sidewall parts formed on both sides of the second supporting part, and locking parts formed on the sidewall parts; and a strip member, which includes first and second supporting parts respectively having loop parts each of which is formed at an end so that the locking part is forcedly fit thereto, a tension spring connected to the other end of the first binding member and at one end of a third binding member, and a tightening member to which the other end of the third binding member is hinge-coupled in the middle of which an end is hinge-coupled to the other of the second binding member.

As described above, when the loop part is locked to the locking part and the tightening member is rotated by hand to be locked in the state in which the nipple of the expansion tank is inserted into the groove, the expansion tank is installed on the support member conveniently. When the tightening member is released, the expansion tank is easily separated from the bracket device, so that a user can effectively perform installation of the expansion tank and disassembly work for maintaining the expansion tank.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The present invention will be described in detail with reference to the accompanying drawings.

The present invention includes a support member 10 installed in a structure of a building, and a strip member 20 to closely install an expansion tank 30 to the support member 10.

The expansion tank 30, which is installed in close contact with the support member 10 by the strip member 20, is formed in a cylindrical shape and includes a nipple 310 protruding to be connected to a hot water heating system.

Figure 1:
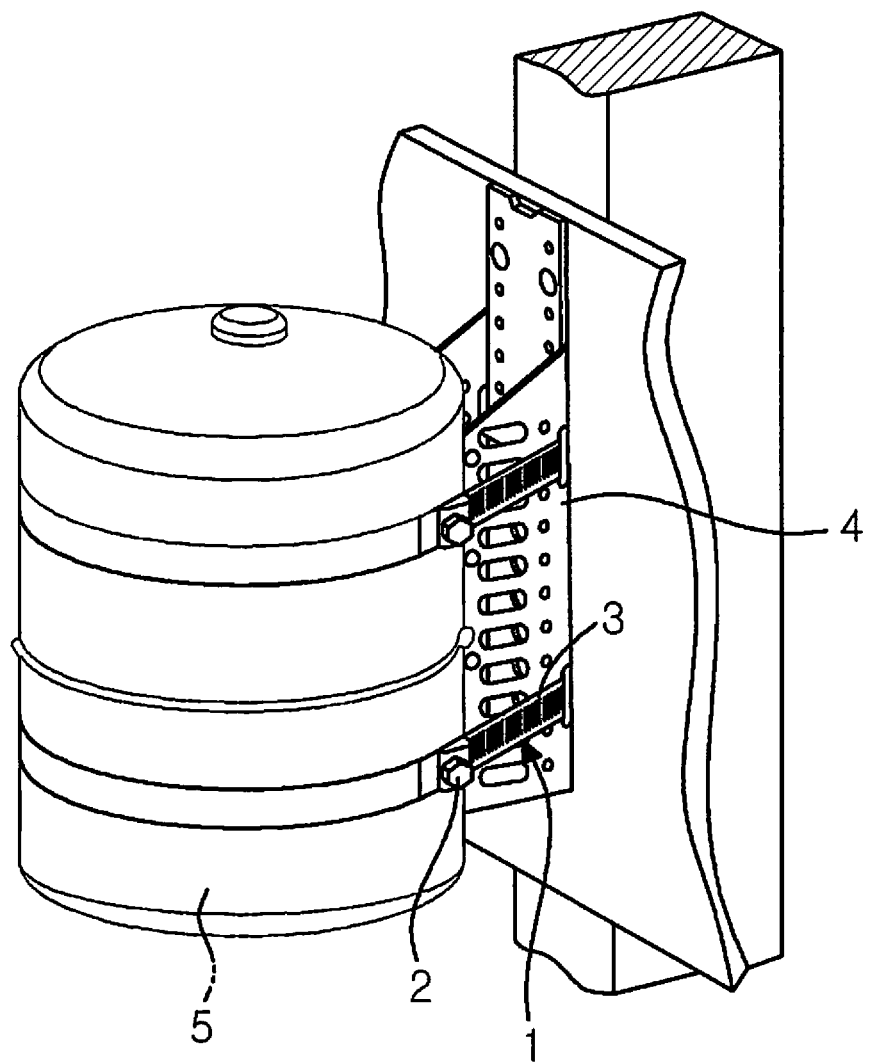
FIG. 1 illustrates a conventional bracket device.
Figure 2:
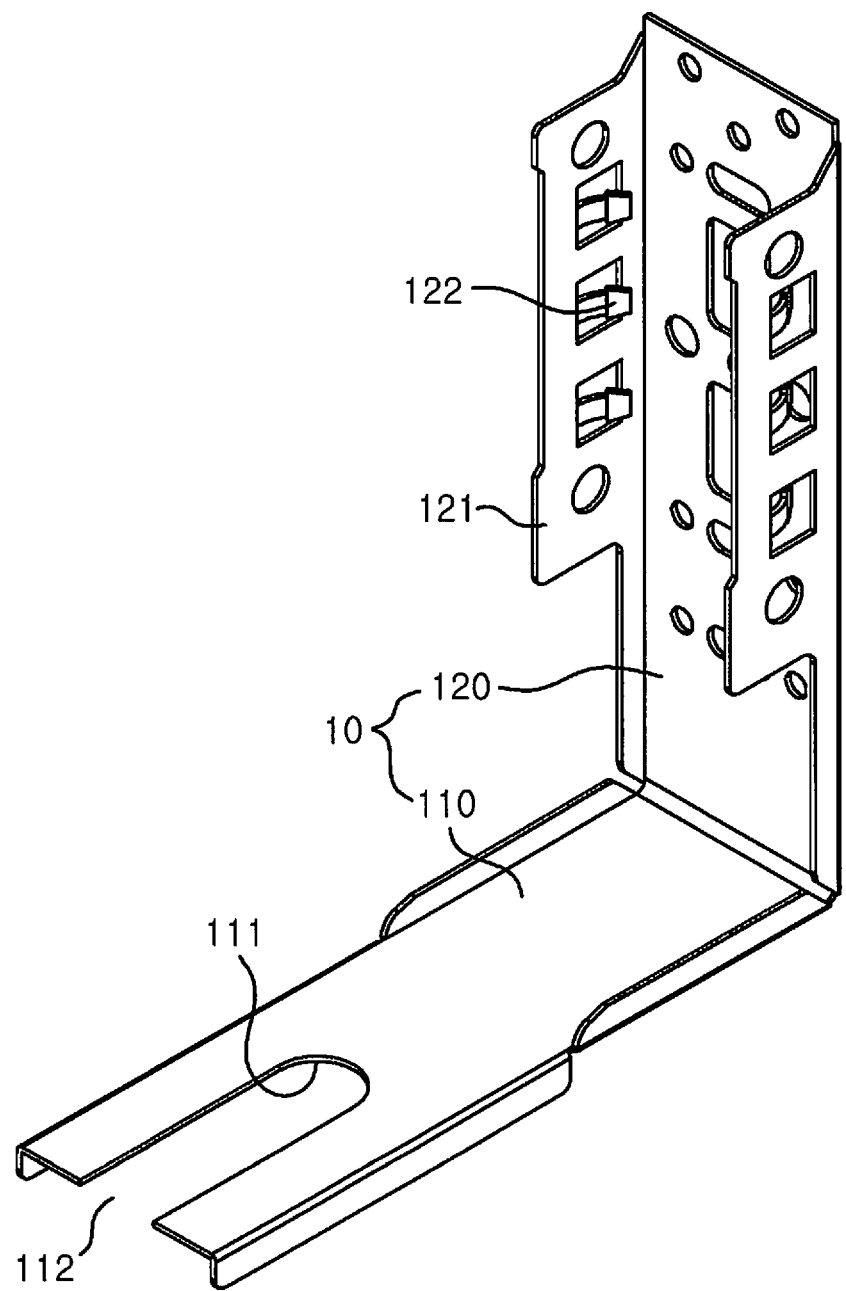
FIG. 2 is a perspective view of a support member of a bracket device for installing an expansion tank according to an embodiment of the present invention.

As illustrated in FIG. 2, the supporting member 10 includes a first supporting part 110 having a groove 111 into which the nipple 310 of the expansion tank 30 is inserted, a second supporting part 120 bent perpendicularly to one side of the first supporting part 110, sidewall parts 121 formed on both sides of the second supporting part 120, and locking parts 122 formed on the sidewall parts 121.

The supporting member 10 is fixed at a position, in which the expansion tank 30 will be installed, by a screw 130 so that the second supporting part 120 is in a vertical or horizontal state.

The first and second supporting parts 110 and 120 include two members which are coupled to be foldable.

In addition, the first and second supporting parts 110 and 120 are manufactured in such a way that a plate of constant thickness is bent.

The groove 111 has an opening 112 through which the nipple 310 passes.

The locking part 122 is formed to be inclined inward from the sidewall parts 121.

Figure 3:
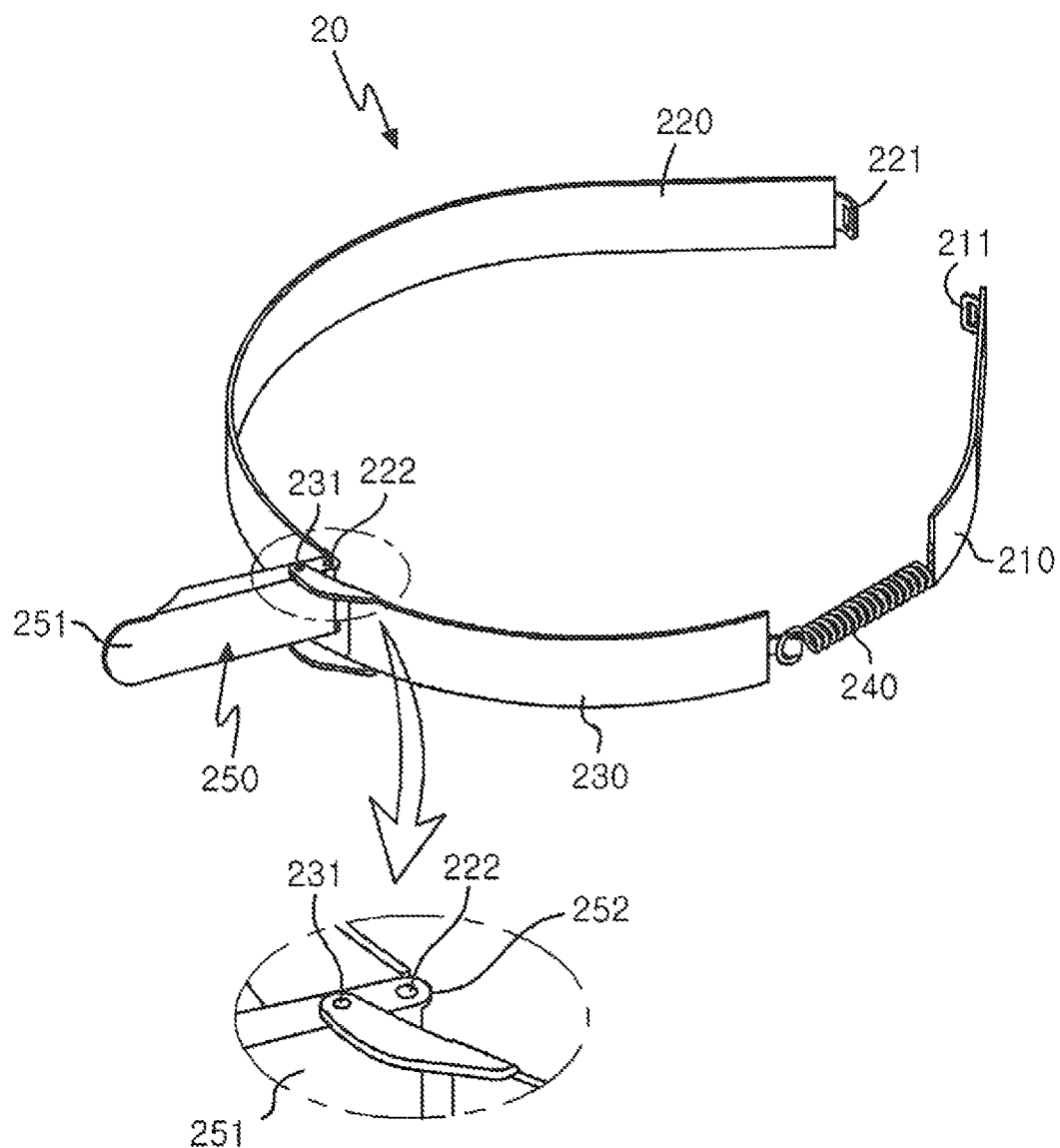
FIG. 3 is a perspective view of a strip member of the bracket device for installing an expansion tank according to the embodiment of the present invention.

As illustrated in FIG. 3, the strip member 20 includes: first and second binding members 210 and 220 respectively having loop parts 211 and 221 each of which is formed at an end of the binding member and to which the locking part 122 is inserted; a tension spring 240 connected to the other end of the first binding member and to one end of a third binding member 230; and a tightening member 250 to which the other end of the third binding member 230 is hinge-coupled in the middle and of which an end is hinge-coupled to the other end of the second binding member 220.

The first to third binding members 210, 220 and 230 are coupled to a support member having predetermined width and thickness, and are bent to form a circle surrounding the outer circumferential surface of the expansion tank 30.

The tightening force of the strip member 20 is determined by a restoring force of the tension spring 240 generated by a distance between a hinge shaft part 222 of the second binding member 220 and a hinge shaft part 231 of the third binding member 230.

The number of the strip members 20 coupled to the support member 10 may be selected according to the size or weight of the expansion tank 30.

In the present invention, the expansion tank 30 is installed on the support member 10 where the first supporting part 110 is fixed by the screw 130.

The expansion tank 30 is placed such that the nipple 310 is located inside the groove 111 through the opening part 112, and then, is coupled the support member 10 by using the strip member 20. The groove 111 serves to prevent the first supporting part 110 from being restricted in structure by the nipple 310 protruding from the expansion tank 30.

Figure 4:
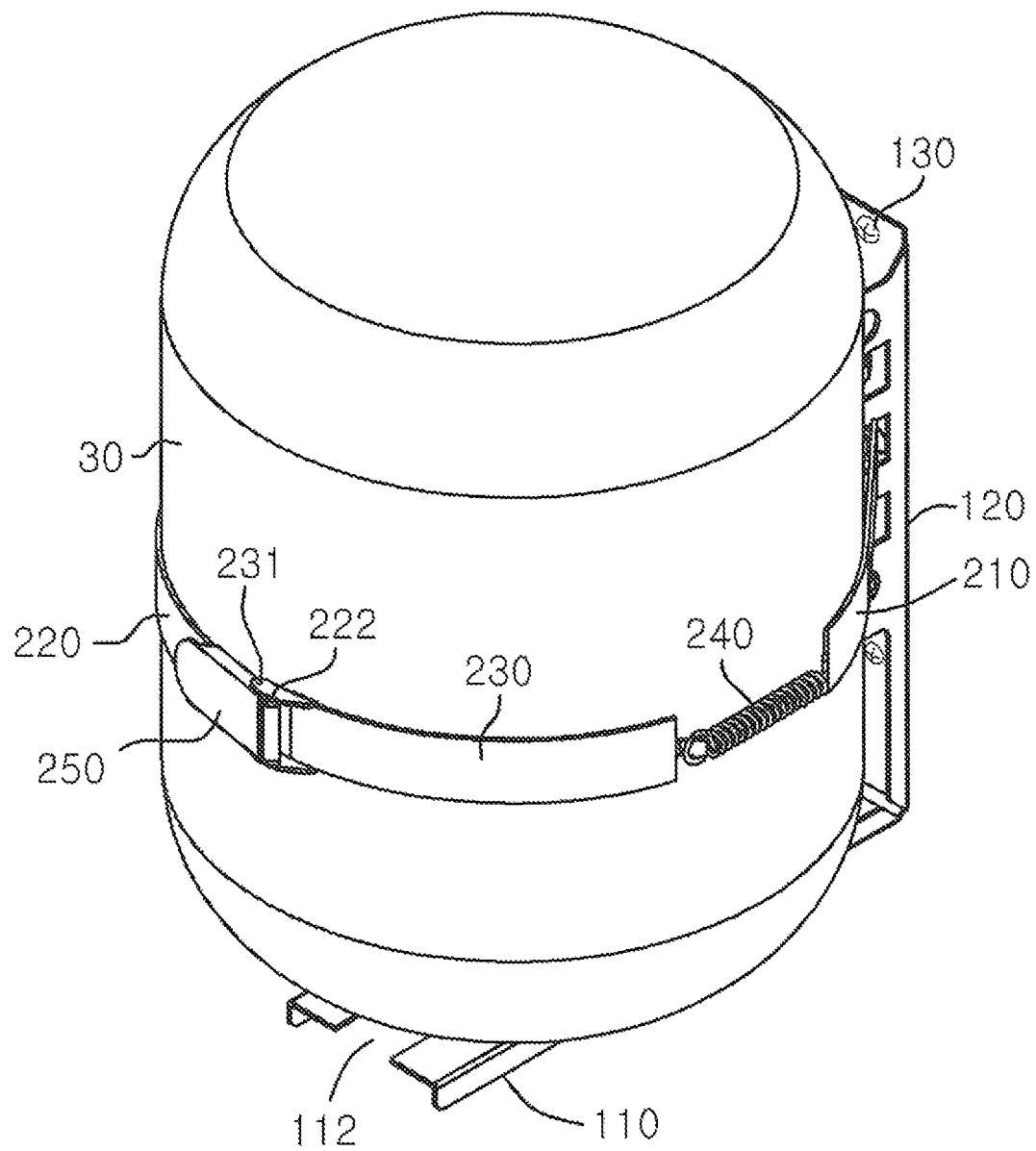
FIG. 4 is a view illustrating a state in which an expansion tank is installed in the bracket device for installing an expansion tank according to the embodiment of the present invention.

The first supporting part 110 may be installed in a vertical or horizontal state according to the installation direction of the expansion tank 30. FIG. 4 is a diagram illustrating a state in which the expansion tank 30 is installed in a vertical direction.

Figure 5A:
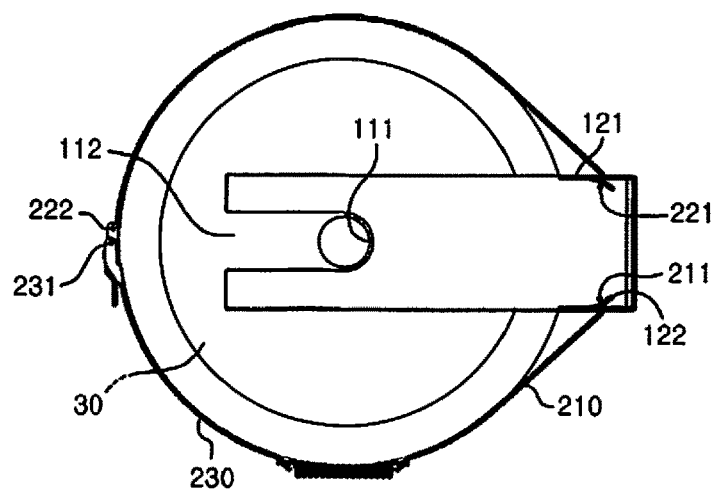
FIG. 5 consists of FIG. 5A-5C is a view illustrating the phases during which a fastening member according to the embodiment of the present invention is locked.
Figure 5B:
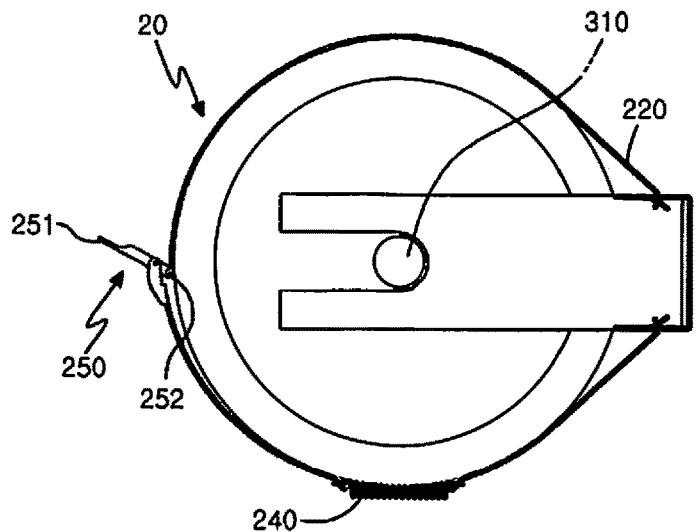
Figure 5C:
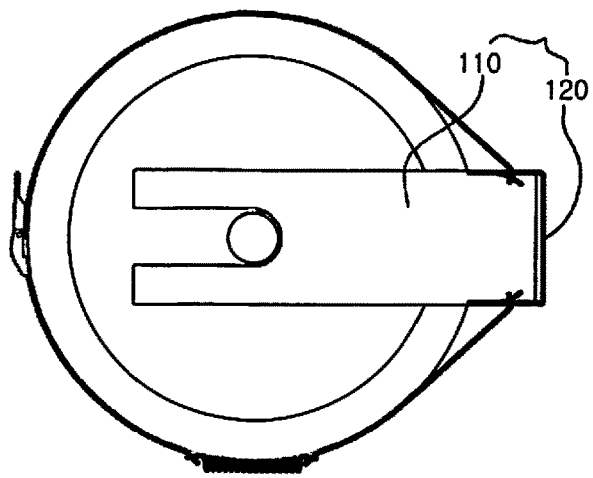

FIGS. 5A through 5C illustrate a process of coupling the expansion tank 30 to the support member 10 using the strip member 20. FIGS. 5A through 5C illustrate a state in which the second binding member 220 is pulled by the tightening member 250 and the tension spring 240 is tensioned so that the first to third binding members 210, 220 and 230 hold the expansion tank 30.

In the state A of FIG. 5 in which a grip portion 251 of the tightening member 250 is overlapped with the third binding member 230, since a space capable of accommodating the expansion tank 30 inside the strip member 20 is maximized, the loop parts 211 and 221 are coupled to the locking part 122 in a state in which an external force is not applied to the tension spring 240.

When the grip part 251 is bent in the state in which the loop parts 211 and 221 are coupled to the locking part 122 in a state in which an external force is not applied to the tension spring 240, as illustrated in FIG. 5B, the hinge part 252 of the tightening member 250 is rotated while moving along the outer circumferential surface of the expansion tank 30.

As illustrated in FIG. 5C, when the tightening member 250 is completely bent toward the second binding member 220, the first to third binding members 210, 220, and 230 tighten the outer circumferential surface of the expansion tank 30 like one round band. In this instance, the tension spring 240 is pulled such that the tension force of the tension spring 240 closely fixes the expansion tank 30 to the sidewall part 121.

Since the first to third binding members 210, 220, and 230 are coupled to the expansion tank 30 to be in close contact with the expansion tank 30, the tightened tightening member 250 is not released unless an artificial force is applied to open the grip 251.

In a case in which the expansion tank 30 coupled to the support member 10 is disassembled, the tightening member 250 is bent in the opposite direction to the assembled direction, and the loop part 211 is separated from the locking part 122 so as to remove the strip member 20.

As described above, when the loop part 211 is locked to the locking part 122 and the tightening member 250 is rotated by hand to be locked in the state in which the nipple 310 of the expansion tank 30 is inserted into the groove 111, the expansion tank 30 is installed on the support member 10 conveniently. When the tightening member 250 is released, the expansion tank 30 is easily separated from the bracket device, so that a user can effectively perform installation of the expansion tank 30 and disassembly for maintaining the expansion tank 30.

Although the present invention has been described in detail with reference to the accompanying drawings, it is to be understood that various changes may be made therein without departing from the spirit and scope of the present invention.

What is claimed is:

1. A bracket device for installing an expansion tank comprising:
   a supporting member, which includes a first supporting part having a groove into which a nipple of the expansion tank is inserted, a second supporting part bent perpendicularly to one side of the first supporting part, sidewall parts formed on both sides of the second supporting part, and locking parts formed on the sidewall parts; and
   a strip member, which includes first and second binding members respectively having a loop part formed at each end thereof so that each locking part is mechanically inserted into each loop part for connection, a tension spring connected to the other end of the first binding member and to one end of a third binding member, and a tightening member to which the other end of the third binding member is hinge-coupled and is also hinge-coupled to the other end of the second binding member.

2. The bracket device according to claim 1, wherein the groove has an opening through which a nipple of the expansion tank passes.

3. The bracket device according to claim 1, wherein the first and second supporting parts of the support member are formed of a plate of constant thickness which is bent perpendicularly.

4. The bracket device according to claim 1, wherein the first and second supporting parts are perpendicular to each other and are capable of being mounted horizontally or vertically to hold the expansion tank.

5. The bracket device according to claim 1, wherein the hinge-coupled ends of the second and third binding members consist of two hinge shafts respectively connected to the ends of the second and third binding member and a grip part to be moved to bring the ends together.

\* \* \* \* \*